(12) United States Patent
Peterson et al.

(10) Patent No.: US 12,504,262 B2
(45) Date of Patent: Dec. 23, 2025

(54) LEAD-FREE AMMUNITION PROJECTILE

(71) Applicant: Lumas Polymers LLC., Chaska, MN (US)

(72) Inventors: Zachary Peterson, New Hope, MN (US); Thomas Fry, Victoria, MN (US)

(73) Assignee: LUMAS Polymers LLC, Chaska, MN (US)

( * ) Notice: Subject to any disclaimer, the term of this patent is extended or adjusted under 35 U.S.C. 154(b) by 0 days.

(21) Appl. No.: 18/994,399

(22) PCT Filed: Jul. 17, 2023

(86) PCT No.: PCT/US2023/027902
§ 371 (c)(1),
(2) Date: Jan. 14, 2025

(87) PCT Pub. No.: WO2024/063839
PCT Pub. Date: Mar. 28, 2024

(65) Prior Publication Data
US 2025/0244112 A1    Jul. 31, 2025

Related U.S. Application Data

(60) Provisional application No. 63/391,509, filed on Jul. 22, 2022.

(51) Int. Cl.
| | |
|---|---|
| *F42B 12/74* | (2006.01) |
| *C08J 3/20* | (2006.01) |
| *C08K 3/01* | (2018.01) |
| *C08K 3/08* | (2006.01) |
| *F42B 33/00* | (2006.01) |

(52) U.S. Cl.
CPC ............ *F42B 12/745* (2013.01); *C08J 3/201* (2013.01); *C08K 3/01* (2018.01); *C08K 3/08* (2013.01); *F42B 33/00* (2013.01); *C08J 2377/06* (2013.01); *C08J 2461/00* (2013.01); *C08K 2003/0856* (2013.01); *C08K 2003/0887* (2013.01); *C08K 2201/005* (2013.01)

(58) Field of Classification Search
None
See application file for complete search history.

(56) References Cited

U.S. PATENT DOCUMENTS

| | | |
|---|---|---|
| 5,237,930 A | 8/1993 | Belanger et al. |
| 5,616,642 A | 4/1997 | West et al. |
| 6,576,697 B1 | 6/2003 | Brown, Jr. |
| 7,392,746 B2 | 7/2008 | Hansen |
| 7,614,349 B2 | 11/2009 | Puskas et al. |
| 9,683,818 B2 | 6/2017 | Lemke et al. |
| 2020/0225012 A1 | 7/2020 | De Bonis |
| 2022/0363825 A1 | 11/2022 | Kubiak et al. |

FOREIGN PATENT DOCUMENTS

| | | | |
|---|---|---|---|
| DE | 19924747 B4 * | 7/2014 | ......... C08G 18/4266 |
| WO | 2021173651 A1 | 9/2021 | |

OTHER PUBLICATIONS

DE 19924747 B4 Lead-free Projectile With Density That Can Be Set As Required (English Translation) (Year: 2014).*
Ecomass Technologies Technical Data Sheet for Ecomass Compound 1850ZN84T1.
Gao, C. et al., "Hyperbranched polymers from synthesis to applications", Prog. Polym. Sci. 29 (2004) 183-275 (93 pages).
International Search Report and Written Opinion issued in co-pending Application No. PCT/US2023/027902 mailed on May 16, 2024 (9 pages).
Jikei, Mitsutoshi et al., "Hyperbranched polymers a promising new class of materials", Prog. Polym. Sci. 26 (2001) 1233-1285 (53 pages).
Mu, Bin et al., "Long-Chain Hyperbranched Polymers Synthesis Properties and Applications", Macromol. Rapid Commun. 2019, 40, 1800471 (26 pages).
Seiler, Matthias, "Hyperbranched polymers: Phase behavior and new applications in the field of chemical engineering", Fluid Phase Equilibria 241 (2006) 155-174) 20 Pages.
Voit, Brigitte I. et al., "Hyperbranched and Highly Branched Polymer Architectures-Synthetic Strategies and Major Characterization Aspects", Chem. Rev. 2009, 109, 5924-5973 (50 pages).

* cited by examiner

*Primary Examiner* — Reginald S Tillman, Jr.
(74) *Attorney, Agent, or Firm* — Young Basile Hanlon & MacFarlane, P.C.

(57) ABSTRACT

A bullet (ammunition projectile) comprising a branched condensation polymer and a filler, wherein the filler is present in an amount from about 10% to 65% by volume of the branched condensation polymer and filler is described. The bullet may be made by heating a mixture comprised of a branched condensation polymer and a filler comprised of a first and second filler having differing densities and differing particle size distribution to form a molten mixture and injecting the molten mixture into a mold to form the ammunition projectile allowing for the tailoring of the characteristics of the bullet for differing applications.

20 Claims, 5 Drawing Sheets

LEAD-FREE AMMUNITION PROJECTILE

CROSS-REFERENCE TO RELATED APPLICATIONS

This application is a United States National Phase filing under 35 USC 371 of PCT Application PCT/EP2023/027902 filed on Jul. 17, 2023, published as WO2024/063839A1, which claims priority from U.S. Provisional Patent Application No. 63/391,509 filed Jul. 22, 2022, all of which are incorporated herein by reference in their entirety for all purposes.

TECHNICAL FIELD

This disclosure relates to a lead-free ammunition projectile comprising a branched condensation polymer and a filler. This disclosure also relates to a method of making an ammunition projectile.

BACKGROUND

Lead has been the most widely used metal of choice for ammunition because of its relative low cost, its low melting temperature, and its density. The environmental and health risks associated with lead, however, have resulted in a comprehensive campaign to eliminate its use in many applications, including lead-containing ammunition. For example, lead pollution at firing ranges has been a problem for a number of years due to poor air circulation after firing indoors and accumulation of projectiles in outdoor ranges. Because of current interest in the reduction of lead pollution, correction of this problem has become more important in recent years.

Additionally, in many types of training situations and confrontational situations, the use of lethal ammunition is not appropriate. During shooting exercises there is a potential risk of being wounded by ricocheting bullets. When the bullet impacts on a surface with a certain angle there is the possibility that not all of the kinetic energy it carries dissipates by breaking or deforming the bullet, that is, part of this energy may remain in the deformed bullet or in a fragment of the bullet, possibly causing undesired injury or collateral damage to other people or objects.

This effect may be avoided or minimized by making the bullet more "frangible", that is, by making it easier for the bullet to break into small parts when it impacts on its main target, such that the energy associated to these tiny fractions of the bullet is very small and the collateral damage they may cause is minimal.

However, previous attempts at non-lead ammunitions (e.g., filled plastic bullets) have one or more shortcomings that have prevented wide use. For example, prior non-metal ammunitions tend to break apart (i.e., individual components separate from one another) during firing. The bullets tend to be of lower mass due difficulty of sufficiently loading the plastic with filler, which may cause decreased accuracy (i.e., tumbling of the bullet may occur). The bullet may, when highly loaded, have non-uniform distribution of the filler which may also cause loss of accuracy.

It would be desirable to provide a lead-free "green" ammunition projectile that are relatively easy to manufacture and use, are economical to make and use, and provide structure that is tunable depending on the desired bullet attributes and withstands forces within the ammunition during firing. For example, it would be desirable to provide a lead-free polymer-based ammunition that is frangible upon impact when discharged in situations wherein a frangible bullet is preferable, but that functions as a traditional bullet in other situations.

SUMMARY

It has been discovered that a bullet (ammunition projectile) having desired attributes may be realized by using a branched polymer having particular attributes that allows for the high and flexible loading of high density fillers while realizing desired bullet characteristics such as the ability to behave in differing ways depending on the target material, increased barrel lubricity and reduced toxicity while realizing uniform high density bullets.

One aspect of the present disclosure relates to an ammunition projectile comprising: a branched condensation polymer, and a filler, wherein the filler is present in an amount from about 10% to 65% by volume of the branched condensation polymer and filler.

Another aspect of the present disclosure relates to a method of forming an ammunition projectile comprising: heating a mixture comprised of a branched condensation polymer and a filler comprised of a first and second filler having differing densities and differing particle size distribution to form a molten mixture, and injecting the molten mixture into a mold to form the ammunition projectile.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Disclosed is an ammunition projectile comprising a branched polymer and a filler. The branched polymer may be any that is commonly understood to be branched including those referred to as hyperbranched, dendritic and the like so long as they have particular properties of melt flow to sufficiently load the filler and retain desired properties.

The branched polymer desirably is a branched condensation polymer. The branched polymer may be any condensation polymer capable of being molded and capable of manufacturing ammunition projectiles having the desired properties. Commercially available condensation polymers tend to have weight average molecular weight averages ($M_w$) greater than 500,000 or 1,000,000 Da and low molecular weights with low melt flow rates (i.e., less than 10 measured at 2.16 kg @ 235° C. 9 g/10/min). To realize the desired melt flow while also having the necessary thermal rheological behavior allowing for uniform dispersion of the filler even when having a high mass (e.g., at least 10 g/cc), it has been discovered that branched condensation polymers having been subject to chain scission by a chain scission/end capping compound incorporated in the condensation polymer may be particularly suitable such as described in copending application PCT/US2021/019391 (WO2021/173651) incorporated herein by reference.

Illustratively, the polymer is a condensation polymer such as a polyamide, polycarbonate and polyester having from 1% to 3% by weight of chain scission/endcapping compound "SE compound". It is understood that SE compound is chemically bonded at room temperature, but may be cleaved at high temperature, which may lead to the formation of differing structures upon successive heating. Examples of particularly suitable SE compounds for polyamides and polyesters include anhydrides and carboxylic acids such as phthalic anhydride, tetrabromophthalic anhydride, hexahydrophthalic anhydride, sulfophthalic anhydride, Trimellitic anhydride, 1,8-Naphthalic anhydride.

The SE compound may introduce useful chemical groups that impart a desired property or characteristic such as flame retardance, UV resistance or other functionality such as capability of undergoing further reactions with differing polymers or reactive groups. For example, the end capping compound (e.g., anhydride) may have a variable functionality as follows. The end capping compounds (e.g., anhydride) may only react once with a polyamide once (functionality of 1), but have a functionality of 2 with a polyester, thus the end capping compound capping the polyamide may have a remaining functionality that allows it to react with a polyester if desired. It is not understood, but such polymers in each successive heating above where the condensation polymer flows and begins to cleave may rearrange to form different structures (e.g., branched to hyperbranched to dendritic). Typically, such heating is to a temperature of at least 200° C., 250° C., 275° C., 300° C. or higher Examples of suitable branched condensation polymers may include a polyamide, polyester, polyacetal, polycarbonate or combination thereof. Any suitable branched condensation polymer may be used including a hyperbranched condensation polymer. Exemplary branched condensation polymers include nylon 6/66/12, subjected to the method as described in WO2021/173651, incorporated herein by reference.

The branched condensation polymer has a melt flow rate sufficient for manufacturing the desired ammunition projectiles having the desired properties as discussed in this application. As measured using (2.16 kg @ 235° C. by ASTM D1238), the melt flow is at least 10 g/10 min, 15 g/10 min or 20 g/10 min to 50 g/min, 75 g/min or 100 g/min.

The filler is present in a sufficient amount to provide the projectile with the desired mass and other characteristics suitable for the particular application. Typically the amount of filler is at least 10% to any practicable amount where the polymer is unable to sufficiently bond the filler particles during firing, which may depend on the particular application and polymer used, with typical amounts up to 65%, or 60% or 55%.

The ammunition projectile comprises a filler. The filler may be any material capable of being admixed with a branched polymer and capable of manufacturing ammunition projectiles having the desired properties. The filler may comprise an inorganic compound having a density of about 5 g/cc or greater, about 8 g/cc or greater, about 10 g/cc or greater. The inorganic compound may comprise a transition metal. The filler may comprise at least one compound comprised of copper, tungsten, iron, bismuth, tantalum, zinc, antimony, and mixtures thereof. The compound may be an alloy or ceramic such as an oxide, carbide, nitride, or combination thereof (e.g., tungsten oxide, tungsten carbide, and ceramic metal composites such as WC—Co).

The filler may have a particle size and particle distribution which facilitates manufacture of the ammunition projectile having the desired properties as discussed in this application. In defining a useful size, the particle size and size distribution is given by the median size (D50), D10, D90 and a maximum size limitation (D100). The size is the equivalent spherical diameter by volume as measured by a laser light scattering method (Rayleigh or Mie with Mie scattering being preferred) using dispersions of the solids in liquids at low solids loading. D10 is the size where 10% of the particles have a smaller size, D50 (median) is the size where 50% of the particles have a smaller size and D90 is the size where 90% of the particles have a smaller size by volume. Generally, the filler has an equivalent spherical diameter median (D50) particle size of about 10 µm to about 130 µm; about 20 µm to about 120 µm, about 25 µm to about 115 µm; D10 of about 1 µm to about 70 µm, 5 µm to about 60 µm, 10 µm to about 50 µm; D90 of about 70 µm to about 215 µm, 60 µm to about 210 µm, 40 µm to about 200 µm; D100 of about 50 µm to about 250 µm, about 45 µm to about 150 µm, about 40 µm to about µm. The filler may have a particle size of about 125 µm or less or about 100 µm or less or 50 µm or less or 30 µm or less or 25 µm. The filler may have an average particle size of about 5 µm to about 110 µm, about 25 µm to about 110 µm.

The filler may comprise a mixture of one or more inorganic compounds. The filler may comprise a mixture of two or more inorganic compounds. The two or more inorganic compounds may have different particle size distributions. The two or more inorganic compounds may comprise a low density compound and a high density compound. As used herein, a low density compound is any compound with a density of less than about 10 g/cc. As used herein, a high density compound is any compound with a density of greater than about 10 g/cc. For example, the low density compound may be a compound comprised of iron and the high density compound may be a compound comprised of tungsten.

Surprisingly, the branched condensation polymers allow for the incorporation of high density filler uniformly throughout the bullet, for example, when injecting molding. This allows for the ability to tune, for example, bullet's performance in differing situations that may be encountered. It also allows for densities equivalent or above copper bullets, even though this may not be necessary for attributes necessary for most situations. For example, the density of the bullet may range from any useful but typically is from about 2 g/cc, 3 g/cc or 4 g/cc to 9 g/cc, 8 g/cc, 7 g/cc or 6 g/cc. Uniformly throughout may be determined by randomly selecting either 10 randomly cubic volumes of about 8 mm$^3$ using X-Ray chromatography techniques and commercially available software to determine the amount of filler in said volumes or physically sectioning a bullet and measuring the density of said cubes, wherein uniform is when the all of the cubes have a density that is within 5% of the average of the cubes, but preferably are within 3%, 2% or even 1%. Likewise, the method may employ random areal densities of 4 mm$^2$ square areas randomly selected from within the bullet.

The filler may comprise a compound comprised of iron having an average particle size of about 25 μm to about 110 μm and a compound comprised of tungsten having an average particle size of about 5 μm to about 10 μm. The compound comprised of iron may be present in an amount from about 10% to about 50% by volume of the branched condensation polymer and filler. The compound comprised of tungsten, may be present in an amount from about 0.1% or 1% to about 20% or 15% by volume of the branched condensation polymer and filler. It is unexpected that the finer filler realizes higher solids loading because of greater surface area that must be wetted by the finer powder by the polymer.

The ammunition projectile may also be comprised of an additive as commonly employed in polymers, such as a lubricant, thermoplastic binder, pigment, or combinations thereof. Any suitable lubricant capable of manufacturing the ammunition projectile having the desired properties as discussed in this application may be used. The lubricant may comprise one or more of a metal salt of a fatty acid and a solid lubricant. Exemplary solid lubricants (e.g., Those having plate-like structures) include one or more of talc, boron nitride, molydisulfide, and clay. The lubricant may comprise an aliphatic polyketone such as described in copending US application (US Pat. Pub. No. 2022/0363825 A1), incorporated herein by reference.

The lubricant may be present in the ammunition projectile in amounts sufficient to facilitate manufacture of the desired ammunition projectile having desired properties as discussed in this application.

Any suitable thermoplastic binder capable of manufacturing the ammunition projectile having the desired properties as discussed in this application may be used. The thermoplastic binder may comprise one or more of hydroxypropylcellulose, hydroxypropylmethylcellulose, hydroxyethylcellulose, carboxymethylcellulose, methylcellulose, cellulose gums and hydroxylalkyl starches. The thermoplastic binder may be present in the ammunition projectile in amounts sufficient to facilitate manufacture of the desired ammunition projectile having desired properties.

Any suitable pigment capable of manufacturing the ammunition projectile having the desired properties as discussed in this application may be used. The pigment may comprise any pigment commonly known and used in the industry. The pigment may be present in the ammunition projectile in amounts sufficient to allow the ammunition projectile to be of the desired coloration and to facilitate manufacture of the desired ammunition projectile having desired properties as discussed in this application.

The amount of additive may be any useful and the amount of each independently and the total additive present may be from 0.1%, 0.5%, or by weight to about 10%, 5%, or 2% by weight.

The ammunition projectile may be formed by any means sufficient to produce a projectile with the properties described herein. Exemplary processes include injection molding, thermal forming, and extrusion, which may employ further machining if desired. Injection molding of the ammunition projectile may be accomplished through multi or single point injection.

Illustratively, the bullet may be formed by a molding process such as injection molding as commonly understood in the art involving heating a mixture comprised of the branched condensation polymer and filler and injecting the molten mass into a mold. In a particular illustration the filler is comprised of a first and second filler having differing densities and differing particle size distribution as described herein.

Further, it has been discovered that the combination of the branched condensation polymer with fillers having the particle sizes described herein realize projectiles as injection molded where the particles are encapsulated by the branched polymer even at filler loadings at least 20%, 30%, 35% or 40% by volume to 60% or 50% by volume. "Encapsulation" as used herein means that there are essentially no exposed filler particles on the surface of the injection molded projectile. Essentially is when no more than or 1% of the surface has an exposed filler particle surface as determined micrographically. In particular it has been discovered that particle size distribution of the lower and higher density fillers described above may realize uniform distribution as well as encapsulation of the fillers even when the powders have vastly different density such as 2, 3, 4, 5 or 6 g/cc or greater difference between the filler densities (e.g., W=19.28 g/cc and Fe 7.87 g/cc).

When employing more than one filler any useful density difference between the fillers may be utilized as described herein. In a particular illustration, the first filler may be any compound with a density of less than about 10 g/cc (low density filler). The second filler may be any compound with a density of greater than about 10 g/cc (high density filler). The density may be measured weight and dimensionally employing, for example, Archimedes' method. For example, the first filler may be a compound comprised of iron and the second filler may be a compound comprised of tungsten. The first filler may have an average particle size of about 25 μm to about 110 μm and the second filler may have an average particle size of about 5 μm to about 10 μm or vice versa. The low density filler may be any useful amount but typically is present in an amount of 10% to about 50% by volume of the mixture (volume of the bullet). The high density filler, may be present in any amount but typically is at least about 0.1%, 1%, 5%, or 10% to 30% or 20% by volume of the bullet. It is unexpected that the finer filler realizes higher solids loading because of greater surface area that must be wetted by the polymer.

The mold may be any acceptable size of an ammunition projectile such as those commonly in use: 5.56 mm, 7.62 mm, 50 caliber, 45 caliber, 380 caliber, 38 caliber, 9 mm, 10 mm, 12.7 mm, 14.5 mm, or 14.7 mm ammunition cartridge.

EXAMPLES

Figure 1:
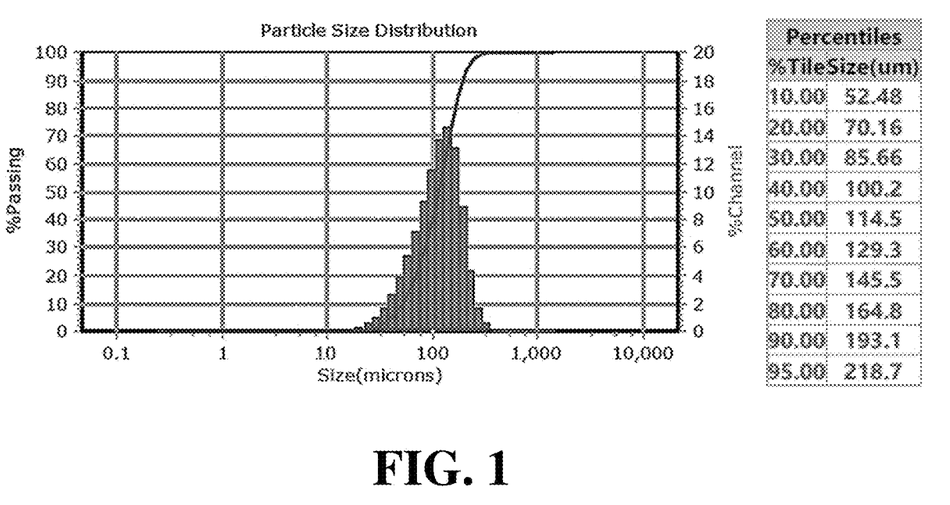
FIG. 1 depicts the particle size distribution of a stainless steel filler incorporated into an ammunition projectile of the disclosure.

Formulations 1 and 2 having differing solids loading are formed by combining branched polyamide 6/66/12 (UBE 6434 having a melt flow rate of about 1.9 (2.16 kg @ 235° C. [g/10 min])) modified using the method described in WO2021/173651 to have a melt flow of 20 to 80 and ATW-150 stainless steel with average particle size of about 114 microns. The particle size distribution for the stainless steel is shown in FIG. 1. Formulations 1 and 2 created are shown in Table 1.

Figure 2:
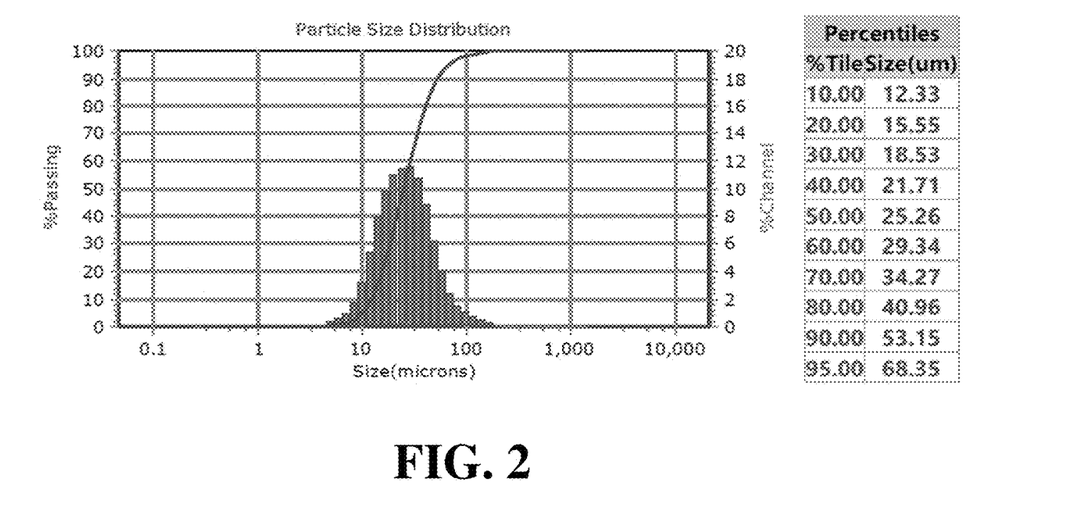
FIG. 2 depicts the particle size distribution of a stainless steel filler incorporated into the ammunition projectile of the disclosure.

Formulation 3 is formed in the same way described above, except the filler is ATW-150 stainless steel with average particle size of about 25 microns. The particle size distribution for the stainless steel is shown in FIG. 2. Formulation 3 created is also shown in Table 1. The change in particle size distribution of ATW-150 realizes a loading rate of 46.5% by volume before encountering injection molding problems.

Figure 3:
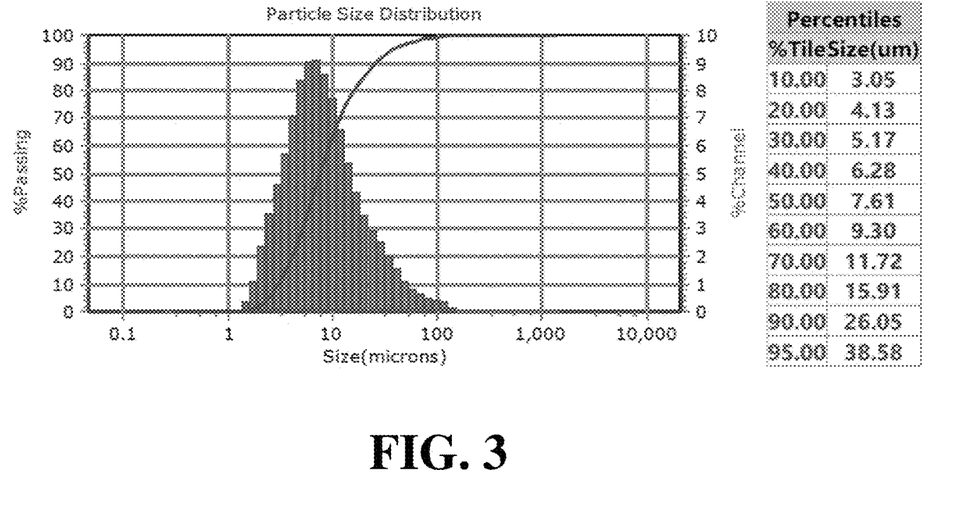
FIG. 3 depicts the particle size distribution of tungsten incorporated into the ammunition projectile of the disclosure.

Formulations 4-9 having differing solids loading are formed by combining branched polyamide 6/66/12 (UBE 6434 having a melt flow rate of about 1.9 (2.16 kg @ 235° C. [g/10 min])) modified using the method described in WO2021/173651 to have a melt flow of 20 to 80 and ATW-150 stainless steel with average particle size of about 114 microns and tungsten with average particle size of about 7.6 micron. The particle size distribution for the stainless steel is shown in FIG. 1. The particle size distribution for the tungsten is shown in FIG. 3. Formulations 4-9 created are shown in Table 1. This ATW-150 steel may loaded into this particular branched polymer up to 42.6% by volume, with problems arising at 45.5% by volume.

TABLE 1

| Formulation | Weight % branched polymer | Weight % 110 μm Fe | Weight % 25 μm Fe | Weight % W | Vol % Fe | Moldable? |
|---|---|---|---|---|---|---|
| 1 | 12.7 | 87.3 | 0 | 0 | 50 | No |
| 2 | 14.3 | 85.7 | 0 | 0 | 46.5 | No |
| 3 | 14.3 | 0 | 85.7 | 0 | 46.5 | Yes |
| 4 | 11.6 | 72.8 | 0 | 15.6 | 45.5 | No |
| 5 | 14.3 | 76.27 | 0 | 9.4 | 42.6 | Yes |
| 6 | 10.8 | 61.5 | 0 | 27.7 | 41.3 | Yes |
| 7 | 14.8 | 70.06 | 0 | 15.1 | 39.1 | Yes |
| 8 | 16 | 64.9 | 0 | 19 | 35.1 | Yes |
| 9 | 15.6 | 60.76 | 0 | 23.6 | 33.9 | Yes |

A Comparative Example 1 is obtained from Ecomass High Gravity Compound 1850ZN84T1 available from Ecomass Technologies, Austin TX.

The Exemplary Formulations and Comparative Example 1 are injection molded and a standard IZOD impact test is conducted in a manner described in ASTM D256. Formulations 8 exhibits an uninstrumented linear resilience of 285.21 (14.07 KJ/m), Formulation 3 exhibits an uninstrumented linear resistance of 266.81 (10.76 KJ/m), and the Comparative Example 1 exhibits an uninstrumented linear resistance of 136.18 (5.721 KJ/m). This surprising in view of Comparative Example 1 having a much lower filler loading and a linear polyamide (PA6) as described below.

Figure 4:
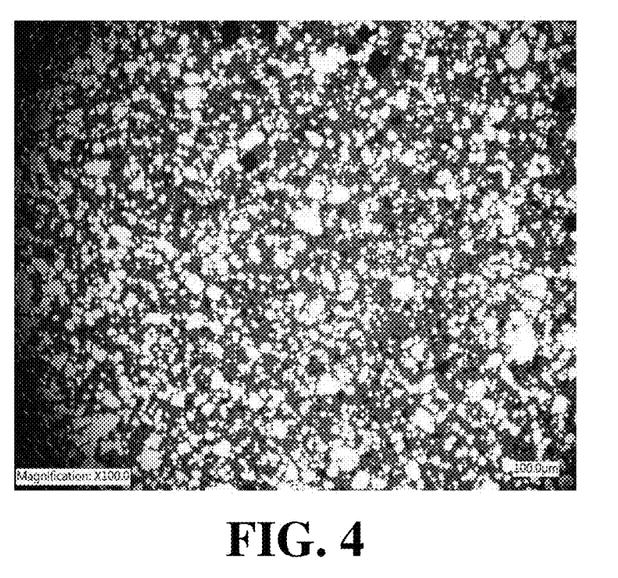
FIG. 4 is an optical micrograph of a polished cross section of an ammunition projectile of this disclosure.
Figure 5:
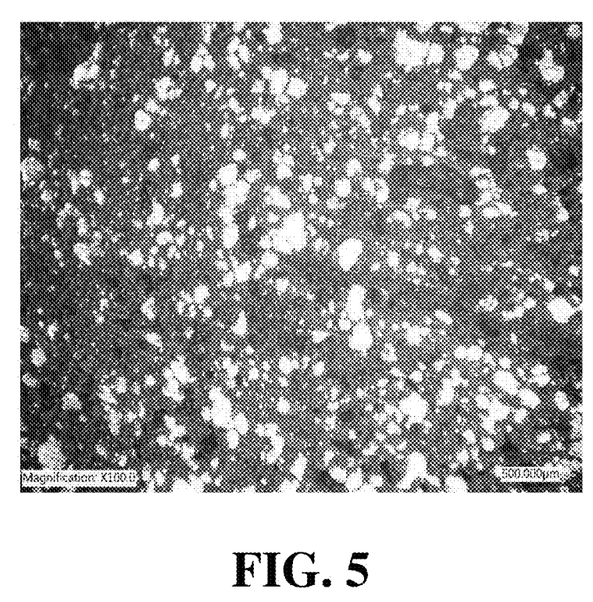
FIG. 5 is an optical micrograph of a polished cross section of a commercial ammunition projectile not of this disclosure.

Cross-sections of the injection molded cylinder Formulation 9 is polished and viewed under a microscope to view density and distribution of the metal particles therein. Optical micrographs of Formulation 9 and Comparative Example 1 are shown in FIGS. 4 and 5, respectively. Metal particles of Formulation 9 have an area density of 40% metal to 60% resin (FIG. 5) and Comparative Example 1 has an area density of 24.3% metal.

A Comparative Example 2 is made in the same way as the Exemplary Formulations except that the condensation polymer is commercially available 6/66/12 polyamide. Injection molding of Comparative Example 2 even at 30% by volume loading of the ATW-150 stainless steel is problematic.

What is claimed is:

1. An ammunition projectile comprising:
   a branched condensation polymer, and
   a filler, wherein the filler is present in an amount from about 10% to 65% by volume of the branched condensation polymer and filler, wherein the branched condensation polymer has a melt flow rate of 10 g/10 min to 100 g/10 min (2.16 kg @ 235° C.).

2. The ammunition projectile of claim 1, wherein the branched condensation polymer has a melt flow rate of 10 g/10 min to 80 g/10 min (2.16 kg @ 235° C.).

3. The ammunition projectile of claim 1, wherein the branched condensation polymer comprises at least one of a polyamide, polyester, polyacetal, and polycarbonate.

4. The ammunition projectile of claim 1, wherein the branched condensation polymer is comprised of a chain scission/endcapping compound.

5. The ammunition projectile of claim 4, wherein the chain scission/endcapping compound is present in an amount of 1% to 3% by weight of the branched condensation polymer.

6. The ammunition projectile of claim 5, wherein the scission/endcapping compound is comprised of a carboxylic acid or anhydride.

7. The ammunition projectile of claim 1, wherein the filler comprises an inorganic compound having a density of 7 g/cc to 20 g/cc and the ammunition projectile has a density of 4 g/cc to 9 g/cc.

8. The ammunition projectile of claim 7, wherein the inorganic compound comprises a transition metal.

9. The ammunition projectile of claim 8, wherein the filler comprises one or more of copper, tungsten, iron, bismuth, tantalum, zinc, antimony, and combinations and alloys thereof.

10. The ammunition projectile of claim 1, wherein the filler has an average particle size of about 5 μm to about 110 μm.

11. The ammunition projectile of claim 1, wherein the filler is comprised of a compound comprised of iron having an average particle size of about 25 μm to 110 μm and a compound comprised of tungsten having an average particle size of about 5 μm to about 10 μm.

12. The ammunition projectile of claim 11, wherein the compound comprised of iron is present in an amount from about 10% to about 50% by volume of the branched condensation polymer and filler and the compound comprised of tungsten is present in an amount from greater than 0% to about 20% by volume of the branched condensation polymer and filler.

13. The ammunition projectile of claim 1, wherein the projectile further comprises an additive in an amount of 0.1% to 10% by weight of the ammunition projectile and the additive is comprised of a lubricant.

14. The ammunition projectile of claim 13, wherein the lubricant comprises an aliphatic polyketone.

15. The ammunition projectile of claim 13, wherein the additive comprises a thermoplastic binder.

16. A method of forming an ammunition projectile comprising:
   (i) heating a mixture comprised of a branched condensation polymer and a filler comprised of a first and second filler having differing densities and differing particle size distribution to form a molten mixture, and
   (ii) injecting the molten mixture into a mold to form the ammunition projectile, wherein the first filler has a density of less than about 10 g/cc and the second filler has a density of greater than about 10 g/cc, the first filler has an average particle size of about 25 µm to about 110 µm, and the second filler has an average particle size of about 5 µm to about 10 µm.

17. The method of claim 16, wherein the mixture comprises about 10% to about 50% by volume of the mixture of the first filler and about 0.1% to about 20% by volume of the mixture of the second filler.

18. The method of claim 16, wherein the first filler is comprised of iron and the second filler is comprised of tungsten.

19. The method of any of claim 16, wherein the branched condensation polymer is comprised of one or more of a polyamide, polyester, polyacetal, and polycarbonate and a scission/endcapping compound, wherein the branched condensation polymer has a melt flow rate of 10 g/10 min to 100 g/10 min (2.16 kg @ 235° C.).

20. The method of claim 19, wherein the branched condensation polymer is the polyamide.

\* \* \* \* \*